US012597637B2

(12) United States Patent
Tanaka et al.

(10) Patent No.: US 12,597,637 B2
(45) Date of Patent: Apr. 7, 2026

(54) SOLID ELECTROLYTE AND ALL-SOLID-STATE BATTERY

(71) Applicant: TDK CORPORATION, Tokyo (JP)

(72) Inventors: Kazumasa Tanaka, Tokyo (JP);
Takehisa Kato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 801 days.

(21) Appl. No.: 17/785,536

(22) PCT Filed: Nov. 30, 2020

(86) PCT No.: PCT/JP2020/044467
§ 371 (c)(1),
(2) Date: Jun. 15, 2022

(87) PCT Pub. No.: WO2021/124849
PCT Pub. Date: Jun. 24, 2021

(65) Prior Publication Data
US 2023/0046253 A1 Feb. 16, 2023

(30) Foreign Application Priority Data
Dec. 17, 2019 (JP) ................................. 2019-227467

(51) Int. Cl.
*H01M 10/0562* (2010.01)

(52) U.S. Cl.
CPC .................. *H01M 10/0562* (2013.01); *H01M 2300/0068* (2013.01)

(58) Field of Classification Search
CPC .................. H01M 10/0562; H01M 2300/0068
See application file for complete search history.

(56) References Cited

U.S. PATENT DOCUMENTS 6,723,470 B2 * 4/2004 Barker ................ H01M 4/5825
429/231.3
2007/0202414 A1 8/2007 Yoshida et al.

FOREIGN PATENT DOCUMENTS

EP           3 447 837 A1     2/2019
JP           2001-143754 A    5/2001
JP           2007-258165 A    10/2007
JP           2015-065021 A    4/2015
WO          WO-2017183255 A1 * 10/2017 ........ H01M 10/0562

OTHER PUBLICATIONS

Translation of WO-2017183255-A1: Yoshioka, 2017, Google Patents.*
Best, A.S, et al. "Characterisation and impedance spectroscopy of substituted li1.3al0.3ti1.7(po4)3-x(zo4)x (Z=V, NB) ceramics." Solid State Ionics, vol. 126, No. 1-2, Nov. 1999, pp. 191-196). (Year: 1999).*
Machine translation of WO-2017183255-A1 (Year: 2017).*
Jan. 19, 2021 International Search Report issued in International Patent Application No. PCT/JP2020/044467.

* cited by examiner

*Primary Examiner* — Allison Bourke
*Assistant Examiner* — Verita E Grannum
(74) *Attorney, Agent, or Firm* — Oliff PLC

(57) ABSTRACT

A solid electrolyte is composed of a compound represented by the general formula $Li_xM_2(PO_4)_z$ where M represents at least one element having a valence of one to four, x represents a number that satisfies $0.800 \leq x \leq 1.900$, and z represents a number that satisfies $2.600 \leq z \leq 2.800$.

8 Claims, 1 Drawing Sheet

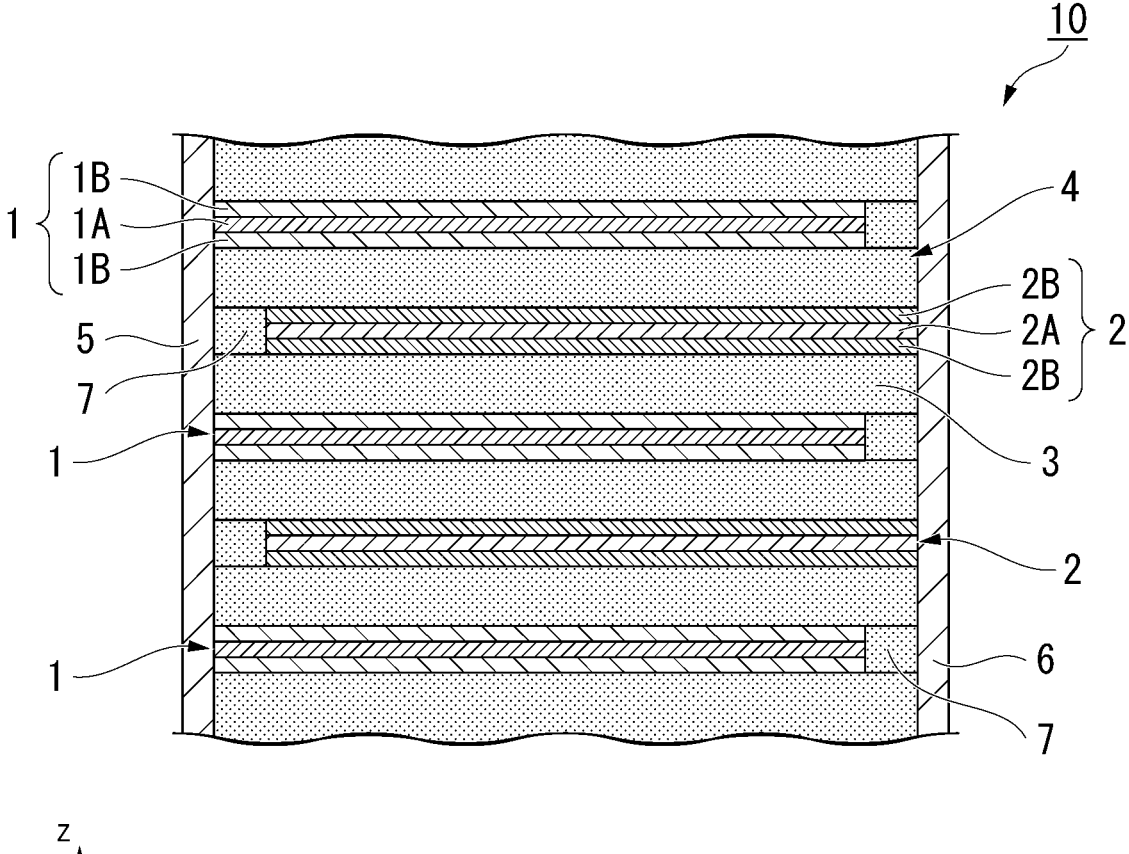

SOLID ELECTROLYTE AND ALL-SOLID-STATE BATTERY

TECHNICAL FIELD

The present disclosure relates to a solid electrolyte and an all-solid-state battery.

Priority is claimed on Japanese Patent Application No. 2019-227467, filed Dec. 17, 2019, the content of which is incorporated herein by reference.

BACKGROUND ART

In recent years, electronics technology has been significantly developed, and the size reduction, weight reduction, thickness reduction, and multi-functionalization of mobile electronic devices have been achieved. Accordingly, for batteries that serve as power sources for electronic devices, there has been a strong demand for size reduction, weight reduction, thickness reduction, and reliability improvement, and all-solid-state batteries in which a solid electrolyte is used as an electrolyte have been gaining attention.

In order to improve characteristics, such as cycle characteristics, of all-solid-state batteries, improving the ion conductivities of solid electrolytes has been effective. Therefore, as materials for solid electrolytes, phosphate compounds having a NASICON-type crystal structure have been in wide use (Patent Literature 1 to 4). Generally, phosphate compounds having a NASICON-type crystal structure are represented by $LiM_2(PO_4)_3$. Here, M represents a tetravalent metal.

In addition, in order to further improve the ion conductivity, studies are underway regarding substitution of some of M with a monovalent to trivalent element (Patent Literatures 1-4). For example, Patent Literature 4 describes a solid electrolyte material represented by a chemical formula $Li_{1+x}M_y(PO_4)_3$ (some of P may be substituted with at least one selected from the group consisting of Si, B, and V, M contains at least one of elements that become monovalent to tetravalent cations, $-0.200 \le x \le 0.900$, and $2.001 \le y \le 2.200$). According to Patent Literature 4, in a case where M contains at least one element that becomes monovalent to tetravalent cations and satisfies $2.001 \le y \le 2.200$, the ion conductivities of solid electrolytes can be improved. In this solid electrolyte material, the proportion of $PO_4$ is small when compared with phosphate compounds having the NASICON-type crystal structure represented by $LiM_2(PO_4)_3$.

CITATION LIST

Patent Literature

[Patent Literature 1]
Japanese Patent Laid-Open No. 2007-258165
[Patent Literature 2]
Japanese Patent Laid-Open No. 2001-143754
[Patent Literature 3]
Japanese Patent Laid-Open No. 2015-065021
[Patent Literature 4]
PTC International Publication No. WO 2017/183255

SUMMARY OF INVENTION

Technical Problem

In order to improve cycle characteristics of the all-solid-state battery, it is desired that the ion conductivity of the solid electrolytes are further improved. Therefore, an objective of the present disclosure is to provide a new solid electrolyte having an improved ion conductivity and an all-solid-state battery in which the solid electrolyte is used and which exhibits excellent cycle characteristics.

Solution to Problem

The present inventors intensively studied the composition ratio between M, which is metallic element, and $PO_4$ in solid electrolytes having a NASICON-type crystal structure represented by a general formula $LiM_2(PO_4)_z$ and consequently found that the ion conductivity of solid electrolyte can be further improved by setting the composition ratio of $PO_4$ in a range of 2.600 or more and 2.800 or less. The inventors completed the present disclosure.

That is, the present disclosure provides the following means to solve the above-described problems.

[1] A solid electrolyte according to a first aspect is composed of a compound represented by the following general formula (1).

$$Li_xM_2(PO_4)_z \tag{1}$$

(In the general formula (1), M represents at least one element having a valence of one to four, x represents a number that satisfies $0.800 \le x \le 1.900$, and z represents a number that satisfies $2.600 \le z \le 2.800$.)

[2] In the general formula (1), M may contain at least one element selected from the group consisting of Na, K, Ag, Au, Ba, Cr, Mn, Fe, Co, Ni, Pd, Pt, Sc, Y, V, Nb, Ta, Ru, Rh, Ir, Al, Ga, In, Mo, W, Tc, Re, Os, Ti, Zr, Hf, Ge, Si, and Sn.

[3] In the general formula (1), M may contain at least one element having a valence of four.

[4] In the solid electrolyte according to the aspect, the general formula (1) may be represented by the following general formula (2).

$$Li_xM'_yM''_{2-y}(PO_4)_z \tag{2}$$

(in the general formula (2), M' represents at least one element selected from the group consisting of Na, K, Sr, Ba, Sc, Y, Zr, V, Nb, Ta, Cr, Mo, W, Mn, Tc, Re, Fe, Ru, Os, Co, Ni, Pd, Pt, Ag, Au, Cd, Hg, Al, Ga, In, Rh, Ir, and Ti, M'' represents at least one element having a valence of four, x represents a number that satisfies $0.800 \le x \le 1.900$, y represents a number that satisfies $0.001 \le y \le 1.999$ and z represents a number that satisfies $2.600 \le z \le 2.800$).

[5] In the solid electrolyte according to the above-described aspect, in the general formula (2), M'' may represent at least one element selected from the group consisting of Ti, Zr, Hf, Ge, Si, and Sn.

[6] An all-solid-state battery according to a second aspect includes a solid electrolyte layer containing the solid electrolyte of the above-described aspect, a positive electrode joined to one surface of the solid electrolyte layer, and a negative electrode joined to the other surface of the solid electrolyte.

Advantageous Effects of Invention

According to the present disclosure, it becomes possible to provide a new solid electrolyte having an improved ion conductivity and an all-solid-state battery in which the solid electrolyte is used.

BRIEF DESCRIPTION OF DRAWINGS

FIG. 1 is a schematic cross-sectional view of an all-solid-state battery according to the present embodiment.

DESCRIPTION OF EMBODIMENTS

Hereinafter, the present disclosure will be described in detail with appropriate reference to a drawing. In the drawing to be used in the following description, there is a case where a characteristic part is shown in an enlarged manner for convenience in order to facilitate the understanding of the characteristics of the present disclosure, and the dimensional ratio and the like of each configuration element are different from actual ones in some cases. Materials, dimensions, and the like to be exemplified in the following description are simply examples, and the present disclosure is not limited thereto and can be appropriately modified and carried out within the scope of the gist of the present disclosure.

All-Solid-State Battery

FIG. 1 is a schematic cross-sectional view of an enlarged main part of an all-solid-state battery according to a first embodiment. As shown in FIG. 1, an all-solid-state battery 10 has a laminate 4. The laminate 4 has a plurality of positive electrode layers 1, a plurality of negative electrode layers 2, and solid electrolyte layers 3 each positioned between the positive electrode layer 1 and the negative electrode layer 2. The positive electrode layer 1 is an example of a first electrode layer, and the negative electrode layer 2 is an example of a second electrode layer. Any one of the first electrode layer and the second electrode layer functions as a positive electrode, and the other functions as a negative electrode. Whether an electrode layer is positive or negative depends on the polarity that is connected to an external terminal.

The positive electrode layers 1 are each connected to a positive electrode external terminal 5, and the negative electrode layers 2 are each connected to a negative electrode external terminal 6. The positive electrode external terminal 5 and the negative electrode external terminal 6 are electrical contacts with the outside.

<Laminate>

The laminate 4 has the plurality of positive electrode layers 1, the plurality of negative electrode layers 2, the plurality of solid electrolyte layers 3 and a plurality of side margin layers 7. The solid electrolyte layers 3 are each positioned between one of the positive electrode layers 1 and one of the negative electrode layers 2. In addition, at one end of the positive electrode layer 1 that is not connected to the positive electrode external terminal 5, the side margin layer 7 substantially as thick as the positive electrode layer 1 is formed. Similarly, at one end of the negative electrode layer 2 that is not connected to the negative electrode external terminal 6, the side margin layer 7 substantially as thick as the negative electrode layer 2 is formed. The all-solid-state battery 10 is charged and discharged by the exchange of lithium ions between the positive electrode layers 1 and the negative electrode layer 2 through the solid electrolyte layers 3.

(Solid Electrolyte Layer)

The solid electrolyte layer 3 contains a solid electrolyte. The solid electrolyte is composed of a compound represented by the following general formula (1). The solid electrolyte may further include anion vacancies.

$$\text{Li}_x\text{M}_2(\text{PO}_4)_z \quad\quad\quad (1)$$

In the general formula (1), x represents a number that satisfies $0.800 \le x \le 1.900$. z represents a number that satisfies $2.600 \le z \le 2.800$. z is preferably a number that satisfies $2.650 \le z \le 2.800$. The x and the z need to be calculated under a condition that the composition ratio of M is 2.

In the general formula (1), M represents at least one element having a valence of one to four. M preferably contains at least one element selected from the group consisting of sodium (Na), potassium (K), silver (Ag), gold (Au), barium (Ba), chromium (Cr), manganese (Mn), iron (Fe), cobalt (Co), nickel (Ni), palladium (Pd), platinum (Pt), scandium (Sc), yttrium (Y), vanadium (V), niobium (Nb), tantalum (Ta), rubidium (Ru), rhodium (Rh), iridium (Ir), aluminum (Al), gallium (Ga), indium (In), molybdenum (Mo), tungsten (W), technetium (Tc), rhenium (Re), osmium (Os), titanium (Ti), zirconium (Zr), hafnium (Hf), germanium (Ge), silicon (Si), and tin (Sn). M more preferably contains only an element having a valence of four or contains an element having a valence of one to three and an element having a valence of four.

As the element having a valence of four, Ti, Zr, Hf, Ge, Si or Sn can be used. These elements may be used alone or two elements may be used in combination. In a case where M contains only the element having a valence of four, M is preferably Ti alone or contains at least one of Zr, Hf, Ge, Si, and Sn in addition to Ti.

In a case where M contains an element having a valence of one to three and an element having a valence of four, M is preferably a compound represented by the following general formula (2).

$$\text{Li}_x\text{M}'_y\text{M}''_{2-y}(\text{PO}_4)_z \quad\quad\quad (2)$$

In the general formula (2), x and z are the same as those in the case of the general formula (1). y is a number that satisfies $0.001 \le y \le 1.999$ and preferably a number that satisfies $0.100 \le y \le 0.300$. The x and the z need to be calculated under a condition that the sum of the composition ratios of M' and M'' is 2.

In the general formula (2), M' represents at least one element selected from the group consisting of Na, K, Sr, Ba, Sc, Y, Zr, V, Nb, Ta, Cr, Mo, W, Mn, Tc, Re, Fe, Ru, Os, Co, Ni, Pd, Pt, Ag, Au, Cd, Hg, Al, Ga, in, Rh, Ir, and Ti. M' is preferably at least one element selected from the group consisting of Ag, Au, Ba, Cr, Mn, Fe, Co, Ni, Pd, Pt, Sc, Y, V, Nb, Ta, Ru, Rh, Ir, Al, Ga, In, Mo, W, Tc, Re, and Os.

In the general formula (2), M'' represents at least one element having a valence of four. M'' is preferably at least one element selected from the group consisting of Ti, Zr, Hf, Ge, Si, and Sn.

The solid electrolyte preferably has a NASICON-type crystal structure. Generally, phosphate compounds having a NASICON-type crystal structure are represented by $\text{LiM}_2(\text{PO}_4)_3$. In contrast, in the solid electrolyte of the present disclosure, as is clear from the general formula (1), the composition ratio of $\text{PO}_4$ is preferably 2.600 or more and 2.800 or less. The reason for the ion conductivity of the solid electrolyte to improve is not necessarily clear, but is considered that the composition ratio of $\text{PO}_4$, which is an anion, is less than that the stoichiometric composition and lattice defects were generated, and therefore, and the lattice defects make it easy for a cation (particularly a Li ion) to migrate in crystals. In the solid electrolyte, some of P in $\text{PO}_4$ may be substituted with an element that forms a tetrahedral structure with oxygen such as silicon (Si), boron (B), molybdenum (Mo), sulfur (S), tungsten (W) or vanadium (V).

The shape of the solid electrolyte does not particularly matter. The shape of the solid electrolyte is, for example, a spherical shape, an ellipsoidal shape, a needle shape, a plate shape, a scale shape, a tubular shape, a wire shape, a rod shape or amorphous. The average particle diameter (D50) of the solid electrolyte is, for example, 0.1 μm or more and 10 μm or less and may be 0.3 μm or more and 9 μm or less. D50 is the diameter of a particle at a cumulative value of 50% in a distribution curve obtained by particle size distribution measurement. The particle size distribution of particles is measured with, for example, a particle size distribution measuring instrument using a laser diffraction and scattering method (Microtrac method).

The solid electrolyte can be produced by, for example, preparing a powder of carbonic acid-containing phosphate (precursor of the solid electrolyte), which is represented by the following formula (3) and contains Li and the element represented by M, and then heating the solid electrolyte precursor to remove carbonate ions.

$$Li_xM_2(PO_4)_z(CO_3)_{4.5-1.5z} \qquad (3)$$

In the general formula (3), M, x and z is the same as that of the above formula (1). That is, in the general formula (3), x represents a number that satisfies $0.800 \leq x \leq 1.900$. z is preferably a number that satisfies $2.650 \leq z \leq 2.800$. The x and the z need to be calculated under a condition that the composition ratio of M is 2.

The solid electrolyte precursor can be synthesized by liquid phase method and manufactured as the following method.

First, the Li source, the M source, and the $PO_4$ source are weighted to be desired composition. Next, the sol of the solid electrolyte precursor are prepared by dissolving the M source in an organic solvent, adding a Li source, a PO4 source, and a $CO_3$ source to the organic solvent, and stirring and mixing the mixture. Next, the sol are dried to obtain gel. After that, the obtained gel is dried and, if necessary, crushed it to obtain powder of a solid electrolyte precursor.

The material which is used as the Li source, the M source, the $PO_4$ source and the $CO_3$ source are not particularly restricted. As the Li source and the M source, carbonates, nitrates, oxides, hydroxides, chlorides, phosphates, and the like can be used. The carbonates also behave used as the $CO_3$ source, and the phosphates also behave as the $PO_4$ source. As the $PO_4$ source, phosphoric acid, ammonium dihydrogen phosphate, diammonium hydrogen phosphate, ammonium dihydrogen phosphate and the like can be used. As the $CO_3$ source, ethylene carbonate, lithium carbonate, ammonium hydrogen carbonate, and the like can be used.

The heating temperature when the solid electrolyte is removed is for example the temperature below the sintering temperature of the solid electrolyte precursor powder, and especially preferably 600° C. or less, although it is not particularly restricted as long as being 300° C. or more. The atmosphere when the solid electrolyte is not particularly limited, and may be an atmospheric atmosphere, a nitrogen atmosphere, an argon atmosphere, or an oxygen atmosphere.

The solid electrolyte precursor from which carbonate ion have been removed is preferably heated at 600 or more and 1500 or less in order to improve the crystalline nature. The atmosphere during sintering is not particularly limited as long as atmosphere other than carbonated atmosphere, and may be an atmospheric atmosphere, a nitrogen atmosphere, an argon atmosphere, or an oxygen atmosphere. Note that, anion vacancies are occurred in the solid electrolyte precursor from which carbonate ion have been removed.

(Positive Electrode Layer and Negative Electrode Layer)

6

For example, a plurality of the positive electrode layers 1 and a plurality of the negative electrode layers 2 are provided in the laminate 4. The positive electrode layer 1 is joined to one major surface of the solid electrolyte layer 3, and the negative electrode layer 2 is joined to the other major surface of the solid electrolyte layer 3.

The positive electrode layer 1 has a positive electrode current collector layer 1A and positive electrode active material layers 1B. The negative electrode layer 2 has a negative electrode current collector layer 2A and negative electrode active material layers 2B.

The positive electrode current collector layer 1A and the negative electrode current collector layer 2A contain a conductive material. The positive electrode current collector layer 1A and the negative electrode current collector layer 2A preferably contain 50% or more of the conductive material. Examples of the conductive material include silver, palladium, gold, platinum, aluminum, copper, nickel, carbon, and the like. In particularly, copper is less likely to react with positive electrode active materials, negative electrode active materials and solid electrolytes, and, for example, when copper is used in the positive electrode current collector layer 1A and the negative electrode current collector layer 2A, the internal resistance of the all-solid-state battery 10 can be reduced. The conductive material is not limited thereto as long as the conductive material does not decompose within the operation voltage range of the battery. Furthermore, the substances that configure the positive electrode current collector layer 1A and the negative electrode current collector layer 2A may be identical to or different from each other.

The positive electrode current collector layer 1A may contain a positive electrode active material to be described below. The negative electrode current collector layer 2A may contain a negative electrode active material to be described below. The content ratio between the active materials that are contained in each of the current collector layers is not particularly limited as long as the current collectors appropriately function. The volume ratio between the conductive material and the positive electrode active material in the positive electrode current collector layer 1A is, for example, within a range of 90:10 to 70:30. Similarly, the volume ratio between the conductive material and the negative electrode active material in the negative electrode current collector layer 2A is, for example, within a range of 90:10 to 70:30. When the positive electrode current collector layer 1A and the negative electrode current collector layer 2A contain the positive electrode active material and the negative electrode active material, respectively, the adhesiveness between the positive electrode current collector layer 1A and the positive electrode active material layer 1B and the adhesiveness between the negative electrode current collector layer 2A and the negative electrode active material layer 2B improve.

The positive electrode active material layer 1B is formed on one surface or both surfaces of the positive electrode active material layer 1A. On the surface of the positive electrode current collector layer 1A on which there is no facing negative electrode 2, the positive electrode active material layer 1B may not be provided. In addition, the negative electrode active material layer 2B is formed on one surface or both surfaces of the negative electrode active material layer 2A. On the surface of the negative electrode current collector layer 2A on which there is no facing positive electrode 1, the negative electrode active material layer 2B may not be provided. For example, the positive electrode layer 1 or the negative electrode layer 2 that is positioned as the uppermost layer or the lowermost layer of the laminate 4 may not have the positive electrode active material layer 1B or the negative electrode active material layer 2B on a single surface.

The positive electrode active material layer 1B and the negative electrode active material layer 2B contain at least a compound capable of absorbing and emitting lithium ions as a positive electrode active material and a negative electrode active material. The positive electrode active material layer 1B and the negative electrode active material layer 2B may contain, in addition to the active material, a conductive auxiliary agent, a conductive ion auxiliary agent, a binder or the like. The positive electrode active material and the negative electrode active material are preferably capable of efficiently intercalating and deintercalating lithium ions.

The positive electrode active material and the negative electrode active material are, for example, transition metal oxides or transition metal composite oxides. The positive electrode active material and the negative electrode active material are specifically, for example, lithium manganese complex oxides $Li_2Mn_aMa_{1-a}O_3$ ($0.8 \leq a \leq 1$, Ma=Co, Ni), lithium cobalt oxide ($LiCoO_2$), lithium nickel oxide ($LiNiO_2$), lithium manganese spinel ($LiMn_2O_4$), complex metal oxides represented by a general formula: $LiNi_x$-$Co_yMn_zO_2$ ($x+y+z=1$, $0 \leq x \leq 1$, $0 \leq y \leq 1$, $0 \leq z \leq 1$), a lithium vanadium compound ($LiV_2O_5$), olivine-type $LiMbPO_4$ (here, Mb is one or more elements selected from cobalt (Co), nickel (Ni), manganese (Mn), iron (Fe), magnesium (Mg), niobium (Nb), titanium (Ti), aluminum (Al), and zirconium (Zr)), lithium vanadium phosphate ($Li_3V_2(PO_4)_3$ or $LiVOPO_4$), Li-rich solid solution positive electrodes represented by $Li_2MnO_3$—$LiM_cO_2$ ($M_c$=Mn, Co, or Ni), lithium titanate ($Li_4Ti_5O_{12}$), titanium oxide ($TiO_2$), complex metal oxides represented by $Li_sNi_tCo_uAl_vO_2$ ($0.9 < s < 1.3$, $0.9 < t+u+v < 1.1$), and the like.

As the positive electrode active material and the negative electrode active material of the present embodiment, a phosphate compound is preferably contained as a main component, for example, any one or a plurality of lithium vanadium phosphate ($LiVOPO_4$, $Li_3V_2(PO_4)_3$, or $Li_4(VO)$ $(PO_4)_2$), lithium vanadium pyrophosphate ($Li_2VOP_2O_7$ or $Li_2VP_2O_7$), and $Li_9V_3(P_2O_7)_3(PO_4)_2$ is preferable, and, particularly, one or both of $LiVOPO_4$, and $Li_3V_2(PO_4)_3$ are preferable.

The main component in the present embodiment means that the proportion of the phosphate compound is more than 50 parts by mass when all of the positive electrode active material and the negative electrode active material in the positive electrode active material layer and the negative electrode active material layer are set to 100 parts by mass. The proportion of the phosphate compound is preferably 80 parts by weight or more.

In addition, in these positive electrode active material and negative electrode active material, some of each element may be substituted with a heterogeneous element or may be changed from the stoichiometric composition. $LiVOPO_4$ and $Li_3V_2(PO_4)_3$ are preferably deficient in lithium and more preferably $Li_xVOPO_4$ ($0.94 \leq x \leq 0.98$) and $Li_xV_2(PO_4)_3$ ($2.8 \leq x \leq 2.95$).

In addition, as the negative electrode active material, for example, lithium metal, a Li—Al alloy, a Li—In alloy, carbon, silicon (Si), silicon oxide ($SiO_x$), lithium titanate ($Li_4Ti_5O_{12}$), and titanium oxide ($TiO_2$) can be used.

Here, there is no clear discrimination between the active materials that configure the positive electrode active material layer 1B and the negative electrode active material layer 2B, and it is possible to compare the potentials of two kinds of compounds, that is, a compound in the positive electrode active material layer and a compound in the negative electrode active material layer, use a compound exhibiting a higher potential as the positive electrode active material and use a compound exhibiting a lower potential as the negative electrode active material. In addition, the same material may be used as the active materials that configure the positive electrode active material layer 1B and the negative electrode active material layer 2B as long as the compound has both a lithium ion emission function and a lithium ion absorption function. When the same material is used as the active materials that configure the positive electrode active material layer 1B and the negative electrode active material layer 2B, since the all-solid-state battery becomes nonpolar, there is no need to designate directions at the time of mounting the electrode active material layers on a circuit board, and thus mountability can be facilitated.

Examples of the conductive auxiliary agent include carbon materials such as carbon black, acetylene black, ketjen black, carbon nanotubes, graphite, graphene, and activated carbon and metal materials such as gold, silver, palladium, platinum, copper, and tin.

As the conductive ion auxiliary agent, for example, a solid electrolyte can be used. As the solid electrolyte, specifically, for example, the same material as the solid electrolyte that is contained in the solid electrolyte layer 3 can be used.

As the binder, for example, an organic binder or an inorganic binder can be used. Examples of the organic binder include polyvinylidene fluoride (PVDF), styrene butadiene rubber (SBR), polyacrylic acids (PAA), polyimides (PI), polyamide-imides (PAI), and the like. Examples of the inorganic binder include lithium halides, silicate-based compounds, phosphate-based compounds, low-melting point glass and the like.

<External Terminals>

For the positive electrode external terminal 5 and the negative electrode external terminal 6, for example, a material that is excellent in terms of the conductive property is used. The positive electrode external terminal 5 and the negative electrode external terminal 6 is, for example, any of silver, gold, platinum, aluminum, copper, tin, and nickel. The positive electrode external terminal 5 and the negative electrode external terminal 6 may be each a single layer or a plurality of layers.

<Protective Layer>

The all-solid-state battery 10 may have a protective layer that electrically, physically, and chemically protects the laminate 4 or the terminals in the outer circumference. For the protective layer, for example, a material that is exceptional in terms of an insulating property, durability and moisture resistance and is environmentally stable is preferable. The protective layer is, for example, glass, ceramic, a thermosetting resin, or a photocurable resin. For the protective layer, only one kind of material may be used or a plurality of kinds of materials may be jointly used. The protective layer may be a single layer or a plurality of layers. The protective layer is preferably an organic-inorganic hybrid in which a thermosetting resin and a ceramic powder are mixed together.

Next, a manufacturing method of the all-solid-state battery according to the present embodiment will be described.

The all-solid-state battery 10 may be produced by a simultaneous firing method or may be produced by a sequential firing method. The simultaneous firing method is a method in which materials that form individual layers are laminated and then collectively fired. The sequential firing method is a method in which each layer is fired every time the layer is laminated. The simultaneous firing method is more convenient in terms of the working steps than the sequential firing method. In addition, the laminate 4 produced by the simultaneous firing method is denser than the laminate 4 produced by the sequential firing method. Hereinafter, the case of using the simultaneous firing method will be described as an example.

First, a paste for each layer that configures the laminate 4 is produced. Materials that turn into the positive electrode current collector layer 1A, the positive electrode active material layer 1B, the solid electrolyte layer 3, the negative electrode active material layer 2B, the negative electrode current collector layer 2A and the margin layer 7 are each made into a paste. A method for making the material into a paste is not particularly limited. For example, the powder of each material is mixed with a vehicle to obtain a paste. The vehicle is a collective term for media in a liquid phase. The vehicle contains a solvent and a binder.

The laminate is preferably produced by preparing positive electrode active material layer units and negative electrode active material layer units, which will be described below, and using these positive electrode active material layer units and negative electrode active material layer units.

The positive electrode active material layer unit can be produced in the following order.

First, the paste for the solid electrolyte layer is formed into a sheet shape on a PET film by the doctor blade method and dried, thereby forming a solid electrolyte green sheet. Next, the paste for the positive electrode active material layer is screen-printed on part of the obtained solid electrolyte green sheet and dried, thereby forming the positive electrode active material layer.

Next, the paste for the positive electrode current collector layer is screen-printed on the obtained positive electrode active material layer and dried, thereby forming the positive electrode current collector layer. In addition, the paste for the positive electrode active material layer is screen-printed one more time on the obtained positive electrode current collector layer and dried, thereby forming the positive electrode active material layer. The positive electrode layer is formed on part of the solid electrolyte layer as described above. Next, the paste for the side margin layer is screen-printed on the solid electrolyte layer on which the positive electrode layer is not formed and dried, thereby forming the side margin layer. In addition, the PET film is peeled off, thereby producing a positive electrode unit. In the positive electrode unit, the positive electrode layer 1 (the positive electrode active material layer 1B/the positive electrode current collector layer 1A/the positive electrode active material layer 1B) and the side margin layer 7 are formed on the solid electrolyte layer 3.

The side margin layers 7 eliminate level differences between the solid electrolyte layer 3 and the positive electrode layer 1 and level differences between the solid electrolyte layer 3 and the negative electrode layer 2 on end faces toward which the positive electrode layers 1 and the negative electrode layers 2 are not extruded. As the side margin layer 7, a material having a poor electron conductive property needs to be used, and, for example, a solid electrolyte is used. The side margin layers 7 may also be separately formed as described above. In addition, instead of separately forming the side margin layers 7, parts of the solid electrolyte layers 3 formed by deformation during lamination may be provided in parallel with the positive electrode layers 1 and the negative electrode layers 2 as the side margin layers 7.

The negative electrode unit is produced in the same order. In the negative electrode unit, the negative electrode layer 2 (the negative electrode active material layer 2B/the negative electrode current collector layer 2A/the negative electrode active material layer 2B), and the side margin layer 7 are formed on the solid electrolyte layer 3.

Next, the positive electrode units and the negative electrode units are laminated. The positive electrode layers and the negative electrode layers are offset such that one end of each positive electrode layer and one end of each negative electrode layer do not face each other, and the positive electrode layers and the negative electrode layers are laminated through the solid electrolyte layer so as to form a comb shape, respectively. Therefore, a laminate substrate including a plurality of the positive electrode layers 1, a plurality of the negative electrode layers 2 and the solid electrolyte layers 3 each positioned between the positive electrode layer 1 and the negative electrode layer 2 is produced. In the laminate substrate, if necessary, external layers can be provided on both major surfaces of the laminate substrate on the uppermost layer and the lowermost layer. For the external layers, the same material as the solid electrolyte can be used, and the external layers can be formed by laminating the solid electrolyte green sheets.

The above-described lamination method of the positive electrode units and the negative electrode units is useful in the case of manufacturing a parallel all-solid-state battery 10 in which the plurality of positive electrode layers 1 connected to the positive electrode external terminal 5 and the plurality of negative electrode layers 2 connected to the negative electrode external terminal 6 are connected to each other in parallel. In the case of manufacturing a serial all-solid-state battery in which a positive electrode layer and a negative electrode layer are connected to each other in series, the positive electrode layer and the negative electrode layer are laminated without being offset such that one end of each positive electrode layer and one end of each negative electrode layer face each other.

Next, the produced laminate substrates are collectively bonded by pressure. The laminate substrates are bonded by pressure while being heated at a low temperature. The heating temperature is set to, for example, 40° C. to 95° C.

The produced laminate is cut into a chip using a dicing device, then, subjected to a debinding treatment as necessary, and then fired, whereby the laminate of the all-solid-state battery is manufactured.

The obtained unfired laminate chip is sintered, whereby the laminate 4 of the all-solid-state battery of the present embodiment is obtained. The laminate chip is sintered by, for example, being heated in a temperature range of 600° C. or higher and 1500° C. or lower in a nitrogen atmosphere. The firing time is set to, for example, 0.1 to three hours.

As described above, before the firing step, the debinding treatment may be carried out as a separate step from the firing step. A binder component contained in the laminate 5 is heated and decomposed before firing, whereby the abrupt decomposition of the binder component in the firing step can be suppressed. The debinding treatment is carried out, for example, at a temperature within a range of 300° C. to 800° C. for 0.1 to 10 hours in a nitrogen atmosphere. In the case of carrying out the debinding treatment in a reducing atmosphere, the laminate chip may be fired in, for example, an argon atmosphere or a nitrogen/hydrogen-mixed atmosphere instead of the nitrogen atmosphere.

The laminate 4 may be put into a cylindrical container together with a polishing agent such as alumina and may be barrel-polished. The polishing chamfers the corners of the laminate 4. The laminate 4 may be polished by sandblasting or the like.

In the end, the positive electrode external terminal 5 and the negative electrode external terminal 6 are mounted on the laminate 4. The positive electrode external terminal 5 and the negative electrode external terminal 6 are each formed so as to be in electric contact with the positive electrode current collector layers 1A or the negative electrode current collector layers 2A. For example, the positive electrode external terminal 5 is connected to the positive electrode current collector layers 1A exposed on the side surface of the laminate 4, and the negative electrode external terminal 6 is connected to the negative electrode current collector layers 2A exposed on the side surface of the laminate 4. The positive electrode external terminal 5 and the negative electrode external terminal 6 can be produced by, for example, a sputtering method, a dipping method, a spray coating method or the like.

The solid electrolyte that is contained in the solid electrolyte layer 3 of the all-solid-state battery 10 according to the present embodiment is composed of the compound represented by the general formula (1) and has a large ratio of $PO_4$ sites to M, and thus the ion conductive property improves. Since the ion conductive property of the solid electrolyte layer 3 has improved, the all-solid-state battery 10 according to the present embodiment becomes excellent in terms of cycle characteristics or the like.

Hitherto, the embodiment of the present disclosure has been described in detail with reference to the drawing, but each configuration in each embodiment, a combination thereof, and the like are examples, and the addition, omission, substitution, and other modification of the configuration are possible within the scope of the gist of the present disclosure.

EXAMPLES

Example 1

(Production of Solid Electrolytes)

As starting materials, lithium nitrate monohydrate ($Li_2NO_3 \cdot H_2O$), aluminum chloride ($AlCl_3$), titanium chloride ($TiCl_4$), 85% phosphoric acid ($H_3PO_4$), and ammonium bicarbonate ($NH_4HCO_3$) were prepared. The prepared $Li_2NO_3 \cdot H_2O$, $AlCl_3$, $TiCl_4$, $H_3PO_4$, and $NH_4HCO_3$ were weighed such that the composition fractions of Li, Al, Ti, $PO_4$, and $CO_3$ became 1.300:0.300:1.700:2.800:0.300(=Li:Al:Ti:$PO_4$:$CO_3$). Next, the weighed $AlCl_3$ and $TiCl_4$ were added to a mixed solvent consist of ethanol and ion-exchange water and stirred by magnetic stirrer for 30 minutes. In addition, $Li_2NO_3 \cdot H_2O$, $H_3PO_4$, and $NH_4HCO_3$ are added and stirred for two hours. After stirred, the solution of the obtained sol was transferred to suction filtration and the mixed solvent was removed, and dried the sol, the mixed solvent of which was removed, at 30° C. to obtain gel. The obtained gel was aged at 100° C. for 6 hours to obtain solid electrolyte precursor. After that, the obtained solid electrolyte precursor was heated at 300° C. for three hours and then, the crystalline nature was enhanced and the carbonate ion in the crystal architecture was removed. After that, the precursor, the carbonate ion of which was removed, was calcined at 700° C. for 1 hour and calcine of the solid electrolyte was obtained. The calcine was pulverized, thereby obtaining calcined powders.

The obtained calcine powder, the mass of which is 0.2 g, was put in the mold with a diameter of 12 mm, and then press molded at the pressure of 2.0 t/cm² and produce a circular compact. The solid electrolyte sintered bodies of Example 1 was obtained by firing the circular compact at 850° C. in the nitride atmosphere for 2 hours.

Examples 2 to 6 and Comparative Examples 1 to 4

Solid electrolyte sintered bodies were obtained in the same manner as in Example 1 except that $Li_2NO_3 \cdot H_2O$, $AlCl_3$, $TiCl_4$, $H_3PO_4$, and $NH_4HCO_3$ were mixed such that the fractions of Li, Al, Ti, $PO_4$, and $CO_3$ became a composition ratio shown in Table 1 below.

TABLE 1

| | Amounts of raw materials blended (mole fractions) | | | | |
| --- | --- | --- | --- | --- | --- |
| | Li | Al | Ti | $PO_4$ | $CO_3$ |
| Example 1 | 1.300 | 0.300 | 1.700 | 2.800 | 0.300 |
| Example 2 | 1.300 | 0.300 | 1.700 | 2.780 | 0.330 |
| Example 3 | 1.300 | 0.300 | 1.700 | 2.740 | 0.390 |
| Example 4 | 1.300 | 0.300 | 1.700 | 2.700 | 0.450 |
| Example 5 | 1.300 | 0.300 | 1.700 | 2.650 | 0.525 |
| Example 6 | 1.300 | 0.300 | 1.700 | 2.600 | 0.600 |
| Comparative Example 1 | 1.300 | 0.300 | 1.700 | 3.000 | 0 |
| Comparative Example 2 | 1.300 | 0.300 | 1.700 | 2.900 | 0.150 |
| Comparative Example 3 | 1.300 | 0.300 | 1.700 | 2.850 | 0.225 |
| Comparative Example 4 | 1.300 | 0.300 | 1.700 | 2.580 | 0.630 |

Evaluation (Composition)

The solid electrolyte sintered bodies was dissolved using nitric acid, and the concentrations of Li, Al, Ti, and P in the obtained solutions were measured by ICP atomic emission spectroscopy. In addition, the composition ratios of Li, Al, Ti, and $PO_4$ were calculated from the obtained concentration of each element. In the calculation of the composition ratio, x and y in a general formula (2) $Li_x M'_y M''_{2-y}(PO_4)_z$ were calculated with the sum of the composition ratios of M' and M'' converted to two. The results are shown in Table 2 below.

(X-ray Diffraction Pattern)

Regarding the crystal structures of the solid electrolyte sintered bodies, X-ray diffraction patterns were measured using CuKα rays. As a result of analyzing the obtained X-ray diffraction patterns, the same X-ray diffraction patterns as that of lithium titanium phosphate ($LiTi_2(PO_4)_3$) in the ICDD card 35-0754 were shown, and thus the solid electrolyte sintered bodies of the Examples and the Comparative Examples were confirmed to have a NASICON-type crystal structure. The results are shown in Table 2 below.

(Ion Conductivity)

Two stainless steel disks and PTFE (polytetrafluoroethylene) disks, the diameter of which are 50 mm and the thickness of which are 5 mm, were prepared. Four screw holes were formed in each of the stainless steel disks and PTFE disks.

The stainless steel disks and PTFE disks were placed above and below of the solid electrolyte sintered body and the solid electrolyte sintered body was pressurized by passing the screws through the four screw holes and tightening the screws. Specifically, the stainless disk/PTFE disk/solid electrolyte sintered body/PTFE disk/stainless disk were laminated in this order and screwed to make a jig for measuring ion conductivity. There are screw holes on the side of the upper and lower punches for inserting screws. Screws were inserted into the upper and lower punches to make terminals for ion conductivity measurement.

After that, ion conductivity of each of the samples under test which was set to the kit of jig for measuring ion conductivity was measured by an electrochemical impedance measurement method using a potentiostat equipped with a frequency response analyzer. The ion conductivity was measured within a frequency range of 7 MHz to 0.1 Hz under conditions of an amplitude of 10 mV and a temperature of 30° C. The results are shown in Table 2 below.
(Production of All-Solid-State Battery and Charge and Discharge Cycle Test)

An all-solid-state battery was produced in the following order. Pastes containing individual materials for forming a positive electrode current collector layer, a positive electrode active material layer, a solid electrolyte layer, a negative electrode active material layer, a negative electrode current collector layer, and a side margin layer were produced. Next, sheets for solid electrolyte layers were produced, and electrode layers and side margin layers were formed on these sheets for solid electrolyte layers, thereby producing electrode units. In addition, the electrode units were alternatively laminated, thereby producing the allsolid-state battery of the present embodiment. Hereinafter, a manufacturing method of Example 1 will be described as a representative example in order.
(Production of Positive Electrode Active Material and Negative Electrode Active Material)

As a positive electrode active material and a negative electrode active material, $Li_3V_2(PO_4)_3$ produced by the following method was used. As the production method, $Li_2CO_3$, $V_2O_5$, and $NH_4H_2PO_4$ were used as starting materials and mixed in a wet process in a ball mill for 16 hours, and a powder obtained by dehydrating and drying the mixture of the starting materials was calcined at 700° C. for two hours in a nitrogen/hydrogen gas mixture. The calcined product was crushed in a wet process with the ball mill, then, dehydrated and dried, thereby obtain calcined powders for the positive electrode active material and the negative electrode active material. As a result of measuring the composition of this produced calcined powder by the X-ray diffractometer, this produced calcined powder was confirmed to be $Li_3V_2(PO_4)_3$.
(Production of Paste for Positive Electrode Active Material Layer and Paste for Negative Electrode Active Material Layer)

As a paste for a positive electrode active material layer and a paste for a negative electrode active material layer, ethyl cellulose (15 parts) as a binder and dihydroterpineol (65 parts) as a solvent were added to the calcined powder of $Li_3V_2(PO_4)_3$ (100 parts), mixed and dispersed, thereby producing both the paste for the positive electrode active material layer and the paste for the negative electrode active material layer.
(Production of Paste for Solid Electrolyte Layer)

Ethanol (100 parts) and toluene (200 parts) were added as solvents to the calcined powder for the solid electrolyte produced in Example 1 (100 parts) and mixed in a wet process with the ball mill. After that, a polyvinyl butyralbased binder (16 parts) and benzyl butyl phthalate (4.8 parts) were further injected thereinto and mixed, thereby producing a paste for a solid electrolyte layer.

(Production of Paste for Positive Electrode Current Collector Layer and Paste for Negative Electrode Current Collector Layer)

As a positive electrode current collector and a negative electrode current collector, a Cu powder and a calcined $Li_3V_2(PO_4)_3$ powder were mixed together such that the volume ratio reached 80/20, and ethyl cellulose (10 parts) as a binder and dihydroterpineol (50 parts) as a solvent were added thereto, mixed and dispersed, thereby producing a paste for a positive electrode current collector layer and a paste for a negative electrode current collector layer.
(Production of Paste for Side Margin Layer)

Ethanol (100 parts) and toluene (100 parts) were added as solvents to the calcined powder of the solid electrolyte (100 parts) produced in Example 1 and mixed in a wet process with the ball mill, next, a polyvinyl butyral-based binder (16 parts) and benzyl butyl phthalate (4.8 parts) were further injected thereinto and mixed, thereby producing a paste for a side margin layer.
(Production of Paste for External Terminal)

A silver powder, an epoxy resin and a solvent were mixed and dispersed, thereby producing a paste for a thermosettype external terminal.
(Production of Sheet for Solid Electrolyte Layer)

The paste for the solid electrolyte layer was formed into a sheet on a PET film by the doctor blade method, and a 15 μm-thick sheet for a solid electrolyte layer was obtained.
(Production of Positive Electrode Unit)

The paste for the positive electrode active material layer was screen-printed on the sheet for solid electrolyte layer to form a 5 μm-thick positive electrode active material layer, and the positive electrode active material layer was dried at 80° C. for 10 minutes. Next, the paste for the positive electrode active material layer was screen-printed on the positive electrode active material layer to form a 5 μm-thick positive electrode current collector layer, and the positive electrode current collector layer was dried at 80° C. for 10 minutes. Furthermore, the paste for the positive electrode active material layer was screen-printed on the positive electrode current collector layer to form a 5 μm-thick positive electrode active material layer one more time, and the positive electrode active material layer was dried at 80° C. for 10 minutes, thereby producing a positive electrode layer on the sheet for solid electrolyte layer. Next, the paste for the side margin layer was screen-printed on a region of the sheet for solid electrolyte layer on which the positive electrode layer was not formed to form a side margin layer as high as the positive electrode layer so as to form substantially the same plane, and the side margin layer was dried at 80° C. for 10 minutes, thereby producing a positive electrode unit.
(Production of Negative Electrode Unit)

Regarding a negative electrode unit, a negative electrode unit was produced by the same method as for the positive electrode unit.
(Production of Laminate)

The positive electrode units and the negative electrode units were each peeled off from a PET film, laminated while being offset such that one end of each positive electrode layer and one end of each negative electrode layer did not coincide with each other, and, when one solid electrolyte layer sandwiched between the positive electrode layer and the negative electrode layer was regarded as one layer, the positive electrode units and the negative electrode units were laminated such that the number of the solid electrolyte layers became 50, thereby producing a laminate substrate. Next, a plurality of the sheets for solid electrolyte layers were laminated as external layers on both major surfaces of the laminate substrate on the uppermost layer and the lowermost layer to provide 500 μm-thick external layers. The outer layers were thermally bonded by pressure by die pressing and then cut, thereby producing an unfired laminate of an all-solid-state battery. Next, the laminate was debinded and characteristics in the present embodiment are calculated by the following calculation formula.

Discharge capacity retention rate (%) after 500
cycles=(discharge capacity after 500
cycles÷discharge capacity after one cycle)×100

TABLE 2

| | Compositions of solid electrolyte sintered bodies $(Li_xM'_yM''_{2-y}(PO_4)_z)$ | | | | X-ray diffraction | Ion | Cycle characteristics: capacity retention |
|---|---|---|---|---|---|---|---|
| | Li | M' Al | M'' Ti | $PO_4$ | pattern (crystal structure) | conductivity $(\times 10^{-5}$ S/cm) | rate after 500 cycles (%) |
| Example 1 | 1.300 | 0.300 | 1.700 | 2.800 | NASICON type | 39 | 95 |
| Example 2 | 1.300 | 0.300 | 1.700 | 2.780 | NASICON type | 40 | 96 |
| Example 3 | 1.300 | 0.300 | 1.700 | 2.740 | NASICON type | 40 | 96 |
| Example 4 | 1.300 | 0.300 | 1.700 | 2.700 | NASICON type | 37 | 95 |
| Example 5 | 1.300 | 0.300 | 1.700 | 2.650 | NASICON type | 36 | 91 |
| Example 6 | 1.300 | 0.300 | 1.700 | 2.600 | NASICON type | 30 | 90 |
| Comparative Example 1 | 1.300 | 0.300 | 1.700 | 3.000 | NASICON type | 12 | 83 |
| Comparative Example 2 | 1.300 | 0.300 | 1.700 | 2.900 | NASICON type | 14 | 84 |
| Comparative Example 3 | 1.300 | 0.300 | 1.700 | 2.850 | NASICON type | 19 | 86 |
| Comparative Example 4 | 1.300 | 0.300 | 1.700 | 2.580 | NASICON type | 19 | 85 | fired, thereby producing a laminate for an all-solid-state battery. In the firing, the temperature was raised up to a firing temperature of 850° C. at a temperature rise rate of 200° C./hour in a nitrogen atmosphere, and the laminate was held at the temperature for two hours, naturally cooled, and then removed.

(Production of External Terminals)

The paste for the external terminal was applied to end faces of the fired laminate for the all-solid-state battery and thermally cured at 150° C. for 30 minutes, thereby forming a pair of external terminals.

(Charge and Discharge Cycle Test)

The charge and discharge cycle characteristics of the all-solid-state batteries produced in the present examples and the comparative examples were evaluated under charge and discharge conditions described below. As the notation of the charge and discharge current, hereinafter, C rate notations will be used. The C rate is expressed as nC (or a current value [A]) (n is a numerical value) and means a current at which the nominal capacity (μAh) can be charged and discharged for 1/n (h). For example, 1C means a charge and discharge current at which the nominal capacity can be charged for 1 h, and 2C means a charge and discharge current at which the nominal capacity can be charged for 0.5 h. For example, in the case of an all-solid-state battery having a nominal capacity of 100 μAh, a current of 0.1 C is 10 μA (calculation formula: 100 μA×0.1=10 μA). Similarly, a current of 0.2 C is 20 μA, and a current of 1 C is 100 μA.

Regarding the conditions of the charge and discharge cycle test, the all-solid-state battery was constant-current-charged (CC charging) in an environment of 25° C. at a constant current of 0.2C rate until a battery voltage of 1.6 V was reached and then discharged at a constant current of 0.2C rate (CC discharging) until a battery voltage of 0 V was reached. The above-described charging and discharging were defined as one cycle, and the discharge capacity retention rate after the charging and discharging were repeated 500 cycles was evaluated as the charge and discharge cycle characteristics. The charge and discharge cycle From the results of Table 2, it is found that, in the solid electrolyte sintered bodies of Examples 1 to 6 where the composition ratios of $PO_4$ were in the range of 2.600-2.800 in a case where the total composition ratio of Al and Ti was set to two, the ion conductivity was especially improved comparing with the sintered body of solid electrolyte of Comparative Example 1 where the composition ratio (stoichiometric composition) of $PO_4$ was 3.000. In addition, it is found that, in the all-solid-state batteries for which these solid electrolyte sintered bodies were used as the solid electrolytes, the cycle characteristics improved. Regarding the reason therefor, a detailed reason is not clear, but is considered as follows. That is, the reason is considered that, in the solid electrolyte sintered bodies obtained in Examples 1 to 6, $CO_3$ ions desorbed from $PO_4$ sites, causing lattice defects at the $PO_4$ site. On the other hand, in the solid electrolyte sintered bodies of Comparative Example 2 where the composition ratio of $PO_4$ was 2.900 and the solid electrolyte sintered bodies of Comparative Example 3 where the composition ratio of $PO_4$ was 2.850, the improvement of the ion conductivity was slight compared to Examples 1-6 although the ion conductivity was improved as well as Comparative Example 1. The reason thereof was considered that the occurrence of lattice defects was not sufficient. In the solid electrolyte sintered body of Comparative Example 4 where the composition ratio of $PO_4$, the ion conductivity was 2.580 decreased comparing with Examples 1-6. The reason thereof was considered that the occurrence of the lattice defects was too much. Note that, although shown in the table 2, anion vacancies were occurred in the solid electrolyte sintered body, and be electrically neutral.

Examples 7 to 10 and Comparative Examples 5 and 6

Solid electrolyte sintered bodies were obtained in the same manner as in Example 1 except that $Li_2NO_3\cdot H_2O$, $AlCl_3$, $TiCl_4$, $H_3PO_4$, and $NH_4HCO_3$ were mixed such that the fractions of Li, Al, Ti, $PO_4$, and $CO_3$ became a composition ratio shown in Table 3 below. For the obtained solid electrolyte sintered bodies, the compositions, the X-ray diffraction patterns, and the ion conductivities were evaluated in the same manner as in Example 1. The results are shown with the result of Example 3 in Table 4 below.

TABLE 3

| | Amounts of raw materials blended (mole fractions) | | | | |
|---|---|---|---|---|---|
| | Li | Al | Ti | PO₄ | CO₃ |
|---|---|---|---|---|---|
| Example 7 | 0.8 | 0.3 | 1.7 | 2.8 | 0.05 |
| Example 8 | 1 | 0.3 | 1.7 | 2.8 | 0.15 |
| Example 1 | 1.3 | 0.3 | 1.7 | 2.8 | 0.3 |
| Example 9 | 1.5 | 0.3 | 1.7 | 2.8 | 0.4 |
| Example 10 | 1.9 | 0.3 | 1.7 | 2.8 | 0.6 |
| Comparative Example 5 | 0.75 | 0.3 | 1.7 | 2.8 | 0.025 |
| Comparative Example 6 | 2 | 0.3 | 1.7 | 2.8 | 0.65 |

TABLE 4

| | Compositions of solid electrolyte sintered bodies (Li$_x$M'$_y$M''$_{2-y}$(PO$_4$)$_z$) | | | | X-ray diffraction | Ion |
|---|---|---|---|---|---|---|
| | Li | M' Al | M'' Ti | PO₄ | pattern (crystal structure) | conductivity ($\times10^{-5}$ S/cm) |
|---|---|---|---|---|---|---|
| Example 7 | 0.800 | 0.300 | 1.700 | 2.800 | NASICON type | 32 |
| Example 8 | 1.000 | 0.300 | 1.700 | 2.800 | NASICON type | 35 |
| Example 1 | 1.300 | 0.300 | 1.700 | 2.800 | NASICON type | 39 |
| Example 9 | 1.500 | 0.300 | 1.700 | 2.800 | NASICON type | 36 |
| Example 10 | 1.900 | 0.300 | 1.700 | 2.800 | NASICON type | 34 |
| Comparative Example 5 | 0.750 | 0.300 | 1.700 | 2.800 | NASICON type | 16 |
| Comparative Example 6 | 2.000 | 0.300 | 1.700 | 2.800 | NASICON type | 19 |

From the results of Table 4, it is found that, in the solid electrolyte sintered bodies of Examples 1 and 7 to 10 where the composition ratios of Li were in the range of 0.800 or more and 1.900 or less, the ion conductivity was especially improved. Note that, although shown in the table 4, anion vacancies were occurred in the solid electrolyte sintered body, and be electrically neutral.

Examples 11-14 and Comparative Examples 7-10

Solid electrolyte sintered bodies according to Examples were obtained in the same manner as in Example 1 except that NaCl (Sodium chloride), CoCl₂ (Cobalt chloride), YCl₃ (Yttrium chloride (III)) or ZrCl₄ (Zirconium chloride (IV)) was used instead of AlCl₃, and these compound were mixed such that the fractions of Na, Co, Y, or Zr became a composition ratio shown in Table 5 below. For the obtained solid electrolyte sintered bodies, the compositions, the X-ray diffraction patterns, and the ion conductivities were evaluated in the same manner as in Example 1. The results are shown in Table 6 below.

TABLE 5

| | Amounts of raw materials blended (mole fractions) | | | | | |
|---|---|---|---|---|---|---|
| | | Metal added | | | | |
| | Li | Kind | Amount blended | Ti | PO₄ | CO₃ |
|---|---|---|---|---|---|---|
| Example 11 | 1.300 | Na | 0.100 | 1.900 | 2.800 | 0.300 |
| Comparative Example 7 | 1.300 | Na | 0.100 | 1.900 | 3.000 | — |
| Example 12 | 1.200 | Co | 0.100 | 1.900 | 2.800 | 0.300 |
| Comparative Example 8 | 1.200 | Co | 0.100 | 1.900 | 3.000 | — |

TABLE 5-continued

| | Amounts of raw materials blended (mole fractions) | | | | | |
|---|---|---|---|---|---|---|
| | | Metal added | | | | |
| | Li | Kind | Amount blended | Ti | PO₄ | CO₃ |
|---|---|---|---|---|---|---|
| Example 13 | 1.100 | Y | 0.100 | 1.900 | 2.800 | 0.300 |
| Comparative Example 9 | 1.100 | Y | 0.100 | 1.900 | 3.000 | — |
| Example 14 | 1.000 | Zr | 0.100 | 1.900 | 2.800 | 0.300 |
| Comparative Example 10 | 1.000 | Zr | 0.100 | 1.900 | 3.000 | — |

TABLE 6

| | Compositions of solid electrolyte sintered bodies (Li$_x$M'$_y$M''$_{2-y}$(PO$_4$)$_z$) | | | | | X-ray diffraction | Ion |
|---|---|---|---|---|---|---|---|
| | Li | M' Kind | M' Content | M'' Ti | PO₄ | pattern (crystal structure) | conductivity ($\times10^{-5}$ S/cm) |
|---|---|---|---|---|---|---|---|
| Example 11 | 1.300 | Na | 0.100 | 1.900 | 2.800 | NASICON type | 23 |
| Comparative Example 7 | 1.300 | Na | 0.100 | 1.900 | 3.000 | NASICON type | 3 |
| Example 12 | 1.200 | Co | 0.100 | 1.900 | 2.800 | NASICON type | 25 |
| Comparative Example 8 | 1.200 | Co | 0.100 | 1.900 | 3.000 | NASICON type | 4 |
| Example 13 | 1.100 | Y | 0.100 | 1.900 | 2.800 | NASICON type | 37 |

TABLE 6-continued

| | Compositions of solid electrolyte sintered bodies ($Li_xM'_yM''_{2-y}(PO_4)_z$) | | | | | X-ray diffraction | Ion |
| | | M' | | M'' | | pattern (crystal | conductivity |
| | Li | Kind | Content | Ti | $PO_4$ | structure) | ($\times 10^{-5}$ S/cm) |
| Comparative Example 9 | 1.100 | Y | 0.100 | 1.900 | 3.000 | NASICON type | 11 |
| Example 14 | 1.000 | Zr | 0.100 | 1.900 | 2.800 | NASICON type | 31 |
| Comparative Example 10 | 1.000 | Zr | 0.100 | 1.900 | 3.000 | NASICON type | 12 |

From the results of Table 6, it is found that, even in a case where, in the solid electrolyte sintered bodies where the element Na (monovalent element), Co (divalent element), Y (trivalent element), or Zr (tetravalent element) was combined, the ion conductivity of the solid electrolyte sintered bodies were improved. Note that, although shown in the table 6, anion vacancies were occurred in the solid electrolyte sintered body, and be electrically neutral.

Examples 15 to 18

Solid electrolyte powders and solid electrolyte sintered bodies were obtained in the same manner as in Example 1 except that, instead of $TiCl_4$, zirconium chloride ($ZrCl_4$), hafnium chloride ($HfCl_4$), germanium chloride ($GeCl_4$) or $SnCl_4$ (tin (IV) chloride) was used, and these compounds were mixed such that the amount of Zr, Hf, Ge or Sn became a composition ratio shown in Table 7 below. For the obtained solid electrolyte sintered bodies, the compositions, the X-ray diffraction patterns, and the ion conductivities were evaluated in the same manner as in Example 1. In the analysis of X-ray diffraction patterns, since the solid electrolyte of Example 15 showed the same X-ray diffraction pattern as that of lithium zirconium phosphate ($LiZr_2(PO_4)_3$) in the ICDD card 072-7742, the solid electrolyte of Example 16 showed the same X-ray diffraction pattern as that of lithium hafnium phosphate ($LiHf_2(PO_4)_3$) in the ICDD card 004-0755, the solid electrolyte of Example 17 showed the same X-ray diffraction pattern as that of lithium germanium phosphate ($LiGe_2(PO_4)_3$) in the ICDD card 080-1992, and the solid electrolyte of Example 18 showed the same X-ray diffraction pattern as that of lithium tin phosphate ($LiSn_2(PO_4)_3$) in the ICDD card 087-2078, respectively, it was confirmed that the solid electrolytes had a NASICON-type crystal structure, respectively. The results are shown in Table 8 below together with the results of Example 1.

TABLE 7

| | Amounts of raw materials blended (mole fractions) | | | | | |
| | | | Metal added | | | |
| | Li | Al | Kind | Amount blended | $PO_4$ | $CO_3$ |
| Example 15 | 1.300 | 0.300 | Zr | 1.700 | 2.800 | 0.300 |
| Example 16 | 1.300 | 0.300 | Hf | 1.700 | 2.800 | 0.300 |
| Example 17 | 1.300 | 0.300 | Ge | 1.700 | 2.800 | 0.300 |
| Example 18 | 1.300 | 0.300 | Sn | 1.700 | 2.800 | 0.300 |

TABLE 8

| | Compositions of solid electrolyte sintered bodies ($Li_xM'_yM''_{2-y}(PO_4)_z$) | | | | | X-ray diffraction | Ion |
| | | M' | M'' | | | pattern (crystal | conductivity |
| | Li | Al | Kind | Content | $PO_4$ | structure) | ($\times 10^{-5}$ S/cm) |
| Example 1 | 1.360 | 0.300 | Ti | 1.700 | 2.800 | NASICON type | 39 |
| Example 15 | 1.300 | 0.300 | Zr | 1.700 | 2.800 | NASICON type | 31 |
| Example 16 | 1.300 | 0.300 | Hf | 1.700 | 2.800 | NASICON type | 34 |
| Example 17 | 1.300 | 0.300 | Ge | 1.700 | 2.800 | NASICON type | 36 |
| Example 18 | 1.300 | 0.300 | Sn | 1.700 | 2.800 | NASICON type | 32 |

From the results of Table 8, it is found that, even in a case where Zr, Hf, Ge or Sn was contained instead of Ti, ion conductivity of the solid electrolyte sintered bodies were improved. Note that, although shown in the table 8, anion vacancies were occurred in the solid electrolyte sintered body, and be electrically neutral.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte layer
4 Laminate
5 Positive electrode external terminal
6 Negative electrode external terminal
7 Side margin layer
10 All-solid-state battery

The invention claimed is:
1. A solid electrolyte composed of a compound represented by the following general formula (1),

$$Li_xM_2(PO_4)_z \qquad (1)$$

wherein in the general formula (1), M represents at least one element having a valence of one to four, x represents a number that satisfies $0.800 \leq x \leq 1.900$, and z represents a number that satisfies $2.600 \leq z \leq 2.800$, and wherein the solid electrolyte sintered body has a NASI-CON-type crystal structure.

2. The solid electrolyte according to claim 1, wherein, in the general formula (1), M contains at least one element selected from the group consisting of Na, K, Ag, Au, Ba, Cr, Mn, Fe, Co, Ni, Pd, Pt, Sc, Y, V, Nb, Ta, Ru, Rh, Ir, Al, Ga, In, Mo, W, Tc, Re, Os, Ti, Zr, Hf, Ge, Si, and Sn.

3. The solid electrolyte according to claim 1, wherein, in the general formula (1), M contains at least one element having a valence of four.

4. The solid electrolyte according to claim 1, wherein the general formula (1) is represented by the following general formula (2), $$Li_xM'_yM''_{2-y}(PO_4)_z \qquad (2)$$

wherein in the general formula (2), M' represents at least one element selected from the group consisting of Na, K, Sr, Ba, Sc, Y, Zr, V, Nb, Ta, Cr, Mo, W, Mn, Tc, Re, Fe, Ru, Os, Co, Ni, Pd, Pt, Ag, Au, Cd, Hg, Al, Ga, In, Rh, Ir, and Ti, M'' represents at least one element having a valence of four, x represents a number that satisfies $0.800 \leq x \leq 1.900$, y represents a number that satisfies $0.001 \leq y \leq 1.999$ and z represents a number that satisfies $2.600 \leq z \leq 2.800$.

5. The solid electrolyte according to claim 4, wherein, in the general formula (2), M'' represents at least one element selected from the group consisting of Ti, Zr, Hf, Ge, Si, and Sn.

6. An all-solid-state battery comprising:

a solid electrolyte layer containing the solid electrolyte according to claim 1;

a positive electrode joined to one surface of the solid electrolyte layer; and a negative electrode joined to the other surface of the solid electrolyte.

7. The solid electrolyte according to claim 4, wherein (M', M'') is any one selected from the group consisting of (Al,Ti), (Na,Ti), (Co,Ti), (Y,Ti), (Zr,Ti), (Al,Zr), (Al,Hf), (Al,Ge) and (Al,Sn).

8. The solid electrolyte according to claim 1, wherein ion conductivity of the solid electrolyte is equal to $23 \ S \times 10^{-5}$ S/cm or more.

\* \* \* \* \*